US012679049B2

(12) United States Patent
Menendez Martin

(10) Patent No.: US 12,679,049 B2
(45) Date of Patent: Jul. 14, 2026

(54) COMPOSITE MANUFACTURING METHOD AND TOOL

(71) Applicant: Airbus Operations S.L., Getafe (ES)

(72) Inventor: Jose Manuel Menendez Martin, Getafe (ES)

(73) Assignee: Airbus Operations S.L., Getafe (ES)

( * ) Notice: Subject to any disclaimer, the term of this patent is extended or adjusted under 35 U.S.C. 154(b) by 192 days.

(21) Appl. No.: 18/330,125

(22) Filed: Jun. 6, 2023

(65) Prior Publication Data

US 2023/0398750 A1 Dec. 14, 2023

(30) Foreign Application Priority Data

Jun. 8, 2022 (EP) ..................................... 22382545

(51) Int. Cl.
 B29C 70/44 (2006.01)
 B32B 37/10 (2006.01)
 B29L 31/30 (2006.01)

(52) U.S. Cl.
 CPC .............. B29C 70/44 (2013.01); B32B 37/10 (2013.01); B29L 2031/3076 (2013.01)

(58) Field of Classification Search
 None
 See application file for complete search history.

(56) References Cited

U.S. PATENT DOCUMENTS

| | | | |
|---|---|---|---|
| 8,262,841 B2 | 9/2012 | Watson et al. | |
| 2008/0178996 A1* | 7/2008 | Tada | B29C 63/025 |
| | | | 156/349 |
| 2010/0124659 A1 | 5/2010 | Nelson et al. | |
| 2012/0125534 A1* | 5/2012 | Watson | B29C 66/1122 |
| | | | 156/583.1 |
| 2013/0115440 A1* | 5/2013 | Hoevel | C08G 59/444 |
| | | | 156/305 |
| 2014/0186609 A1* | 7/2014 | Qin | B29C 45/14311 |
| | | | 428/221 |
| 2018/0304606 A1* | 10/2018 | Rotter | B29C 66/00145 |
| 2019/0283339 A1 | 9/2019 | Meyer et al. | |
| 2022/0152956 A1 | 5/2022 | Smith et al. | |

OTHER PUBLICATIONS

European Search Report for European Patent Application No. 22382545 dated Jan. 4, 2023; priority document.

* cited by examiner

*Primary Examiner* — Christopher T Schatz
(74) *Attorney, Agent, or Firm* — Greer, Burns & Crain, Ltd.

(57) ABSTRACT

A method and a tool for manufacturing a composite structure by integrating and curing together semi-finished components by heat and pressure.

14 Claims, 5 Drawing Sheets

COMPOSITE MANUFACTURING METHOD AND TOOL

CROSS-REFERENCES TO RELATED APPLICATIONS

This application claims the benefit of the European patent application No. 22382545.6 filed on Jun. 8, 2022, the entire disclosures of which are incorporated herein by way of reference.

FIELD OF THE INVENTION

The present invention belongs to the field of manufacturing of composite structures, and particularly, the invention provides a method and a tool for manufacturing a composite structure by integrating and curing together semi-finished components by heat and pressure.

BACKGROUND OF THE INVENTION

Historically, aircraft parts with structural applications have been made of aluminum alloys. In the past few decades, with the development of composite manufacturing technologies, such structural parts have been manufactured with different techniques.

Composite structures used in the aircraft industry are structural components composed by one or several subcomponents constituted by bi-dimensional layers and/or tri-dimensional preforms made of a continuous matrix (typically a polymer, although other materials can be used) reinforced by continuous or discontinuous fibers (typically carbon, glass, aramid, etc.).

When the polymer matrix is a thermoset resin (e.g., an epoxy), such resin may be in three different conditions depending on the degree of the polymerization, that is, the degree of toughening or hardening of the resin by the cross-linking of polymer chains during a curing process:

A-stage: The components of the resin (base material and hardener) have been mixed but the chemical reaction has not started. For example, the resin is in the A-stage during a wet layup procedure or during the infusion of the resin in liquid resin based processes (liquid resin infusion, resin transfer molding, etc.).

B-stage: The components of the resin have been mixed and the chemical reaction has started and progressed up to 10% approximately. This is the case of pre-impregnated materials. Resin in the B-stage and semi-processed materials shall be stored in a freezer at −18° C. or below to avoid the progress of the reaction.

C-stage: The resin is fully cured.

A-stage and B-stage materials degrade easily and require their storage at temperatures below −18° C. The handling of B-stage materials requires the use of clean rooms to avoid contamination.

According to the state of the art, a composite structure can be manufactured following three different integration methods depending on the stage of the resin of the subcomponents:

Co-curing: when the subcomponents to be integrated are all in green/fresh condition (the resin is in A-stage or in B-stage). Sometimes, when the subcomponents are in B-stage, a layer of resin or adhesive in B-stage is added in the interface between the subcomponents. Co-curing allows a high level of integration with excellent structural performances, but at the cost of expensive tooling, complex vacuum bags with costly ancillary materials, and bulky and expensive autoclaves.

Co-bonding: when the integration occurs between at least one subcomponent in A-stage or B-stage and at least one subcomponent in C-stage. In most cases, a layer of resin or adhesive in B-stage is added to the interface between the subcomponents. Co-bonding may slightly alleviate some of the issues found in co-curing but has the added complexity of the surface preparation of the bonding line of the C-stage subcomponents and the use of adhesive.

Secondary bonding: when all the subcomponents are in C-stage. In this case, a layer of resin or adhesive in B-stage added to the interface between the subcomponents is necessary to join the subcomponents. Secondary bonding is only used in structures with non-critical structural requirements.

The most extended industrial methods to manufacture composite structures involve the combined use of a vacuum bag and an autoclave to apply the temperature required to polymerize the resin and/or the adhesive, and the uniform pressure required to consolidate the composite layers removing the trapped volatiles. However, these methods impose strong constraints due to the high investment of an autoclave and the intensive labor for manufacturing complex vacuum bags, very difficult to be automated.

SUMMARY OF THE INVENTION

The present invention provides a solution for the aforementioned problems.

In a first inventive aspect, the invention provides a method for manufacturing a composite structure, the method comprising:

a) providing at least two partially cured fiber reinforced polymer (FRP) parts;

b) forming an ensemble joining at least two partially cured FRP parts by bringing into contact a first bonding portion of a first partially cured FRP part with a second bonding portion of a second partially cured FRP part;

c) providing a mold comprising a first mold part and a second mold part configured for coupling with each other, such that an inner chamber is defined when the first and second mold parts are coupled to each other, the inner chamber being configured for housing the ensemble inside, wherein the first mold part is provided with a first pressing surface, and the second mold part is provided with a second pressing surface, such that the first and second pressing surfaces are configured to be arranged facing each other when the first and second mold parts are coupled to each other;

d) coupling the first and second mold parts such that the ensemble is housed within the inner chamber defined by the first and second mold parts, wherein the first pressing surface presses against the first bonding portion of the first partially cured FRP part, and the second pressing surface presses against the second bonding portion of the second partially cured FRP part, such that the pressure exerted by the first and second pressing surfaces presses the first and second bonding portions against each other;

e) producing a vacuum in the inner chamber; and f) curing the ensemble under vacuum and temperature.

The properties of any FRP structure are determined by the manufacturing process conditions. Accordingly, throughout this entire document, 'partially cured' or 'pre-cured', fiber reinforced (FRP) parts should be understood as parts composed of composite materials which have undergone an incomplete curing cycle, or 'partial curing cycle' (intermediate between B-stage and C-stage), compared to the application of a complete curing cycle under predetermined duration and temperature conditions according to which the composite parts reach the desired chemical and mechanical properties, and so can be considered as 'completely cured', or just 'cured'.

More in particular, it shall be understood that the FRP structures which have undergone a partial curing cycle are at least in B-stage, that is, in a state wherein the components of the resin have been mixed and the chemical reaction has started and progressed up to 10% approximately, so that the resin undergoes a partial cure, changing its state from liquid to solid and is generally tacky. Advantageously, by virtue of the minimum degree of curing (at least 10%) reached in the B-stage of the resin, the chemical cross-linking between polymer chains contributes to reducing resin flow, as well as to providing a certain stiffness which facilitates handling, storage and later processing properties.

In this regard, the partially cured FRP structures provided in step a) are ready to be assembled (i.e., joined to each other), according to step b), in such a way as to define an ensemble having the final shape of the composite structure intended to be manufactured by applying a complete curing process (i.e., applying a thermodynamic cycle of pressure and temperature) to the ensemble.

In particular, the ensemble is formed by joining at least two partially cured FRP parts by bringing into contact a first bonding portion of a first partially cured FRP part with a second bonding portion of a second partially cured FRP part. In this sense, it will be understood that first and second partially cured FRP parts, and more particularly, each corresponding first and second bonding portion, are provided with a complementary geometry or shape such that they can couple to each other, preferably continuously along the corresponding surfaces facing each other and brought into contact according to step b). In an embodiment, the corresponding surfaces of the first and second bonding portions are substantially flat.

Representative, but non-exclusive, examples of ensembles formed for manufacturing composite structures according to the method of the invention are those comprising a first partially cured FRP part in the form of a substantially flat skin or panel and at least one second partially cured FRP part in the form of a stringer, such as an omega-profile stringer, a T-shape stringer, a double T-shape stringer, an L-shape stringer, a C-shape stringer, a J-shape stringer, a Z-shape stringer, etc.). In this sense, the method of the invention can be used to manufacture a wide range of aircraft structural components with different geometries (e.g., 2D and 3D structures like wing skins and other lifting surfaces, fuselage skins, ribs, frames, fittings, etc.).

As the FRP parts are partially cured, in order to apply the final curing process to the ensemble, the only areas that require pressure are the contact zones between the first and second partially cured FRP parts, i.e., the corresponding first and second bonding portions.

For this purpose, according to step c) of the method, a closable mold is provided comprising an internal volume configured for housing the ensemble to which the curing cycle is to be applied to obtain the composite structure to be manufactured. In connection with the curing cycle, the mold will be responsible, at least, of transmitting the pressure necessary to integrate the partially cured FRP parts forming the ensemble.

In this sense, the mold provided in step c) comprises a first mold part and a second mold part configured for coupling with each other, such that an inner chamber is defined when the first and second mold parts are coupled to each other, the inner chamber being configured for housing the ensemble inside.

For the application of pressure onto the ensemble, the first mold part is provided with a first pressing surface, and the second mold part is provided with a second pressing surface, such that the first and second pressing surfaces are configured to be arranged facing each other when the first and second mold parts are coupled to each other.

In particular, according to step d) of the method, the first and second mold parts are coupled enclosing the ensemble within the inner chamber, and the first pressing surface presses against the first bonding portion of the first partially cured FRP part, while the second pressing surface presses against the second bonding portion of the second partially cured FRP part. This way, the pressure exerted by the first and second pressing surfaces presses the first and second bonding portions against each other.

Finally, in order to generate the pressure necessary to carry out the consolidation in the curing process according to step f), which is applied to the bonding portions of the ensemble through the corresponding pressing surfaces of the first and second parts of the mold, a vacuum is generated inside the inner chamber defined by the first and second parts of the mold, where the ensemble is confined. In particular, according to step e) of the method, vacuum is generated inside the inner chamber and then, due to the atmospheric pressure, the closure force of the first and second parts of the mold corresponds to the product of the negative vacuum achieved and the size of the surface of both pressing surfaces. According to step f), vacuum is maintained and heat is applied to allow reaching the proper temperature to complete the polymerization of the resin and thus the curing of the ensemble.

In an embodiment, at least one of the first and second parts of the mold is slender enough to allow certain level of elastic deformation to uniformly transmit such closure force in the zones of the first and second parts of the mold in direct contact (if any) and in the zones where the mold is pressing the areas where the partially cured FRP parts are in contact, the pressure applied to such zones being approximately the product of the negative vacuum and the ratio between the size of the total surface of the first and second mold parts and the total contact surface (i.e. the size of the contact surface of the zones of the first and second mold parts in direct contact (if any) plus the size of the surface of both pressing surfaces).

That is, the resultant force of the difference between the atmospheric pressure and the vacuum pressure inside the mold applied on it is equal to the sum of the resultant forces at all points of contact between the first and second mold parts and between the pressing surfaces and the corresponding bonding parts of the FRP parts.

The method according to the present invention allows manufacturing a composite structure based on two or more partially cured FRP parts. Where more than two partially cured FRP parts are provided in step a), the first mold part and/or the second mold part are provided with a plurality of pairs of complementary pressing surfaces (i.e., a plurality of corresponding first and second pressing surfaces), each first pressing surface of the first mold part being configured to be arranged facing a corresponding second pressing surface of the second mold part when the first and second mold parts are coupled to each other. Thus, when the first and second mold parts are coupled and the ensemble is housed within the inner chamber defined by the first and second mold parts, the first and second pressing surfaces press, two by two, against adjacent bonding portions of different partially cured FRP parts, such that the different bonding portions are pressed against each other by the action of the first and second pressing surfaces. In particular, each first pressing surface present in the first mold part presses against a bonding portion of one of the partially cured FRP parts, and each second pressing surface present in the second mold part presses against an adjacent bonding portion of a different partially cured FRP part.

Advantageously, the method according to the present invention simplifies the tooling concept associated to the industrial manufacturing of composite structures, as well as reduces the resource costs involved, given that it prevents the use of complex vacuum bags and an autoclave for the integration of the partially cured FRP parts, or, alternatively, the use of bulky and complex hot plates presses.

Step b) of the method may be performed at different moments, according to different embodiments of the invention.

In an embodiment, step b) is performed prior to steps c) and d). The ensemble formed by the partially cured FRP parts is thus formed at a stage prior to inserting the FRP parts in the mold. In this embodiment, the ensemble once formed is inserted in the mold in step d).

In another embodiment, step b) is performed subsequently to steps c) and d). According to this embodiment, the partially cured FRP parts are inserted in the mold before the partially cured FRP parts are joined. In an embodiment, a first partially cured FRP part is arranged on/attached to the first mold part, a second partially cured FRP part is arranged on/attached to the second mold part, and the ensemble is formed when the first and second mold parts are coupled, enclosing the ensemble within the inner chamber. In another embodiment, a first partially cured FRP part is arranged on/attached to the first or the second mold part, a second partially cured FRP part is arranged with its bonding portion contacting the bonding portion of the first partially cured FRP part, thus forming the ensemble, and the first and second mold parts are coupled enclosing the ensemble within the inner chamber.

In an embodiment, the FRP parts provided in step a) of the method of the present invention have a degree of cure between 25% and 75%, wherein 100% corresponds to complete curing of the resin of the FRP parts. A degree of cure between 25% and 75% is higher than the one of regular B-stage materials. Thus, the FRP parts according to this embodiment may be considered to belong to an advanced B-stage condition.

Advantageously, in this embodiment the FRP parts are processed so as to reach a degree of cure according to which the matrix has a higher molecular weight than typical resins in order to reduce resin flow, which provides a certain stiffness which facilitates handling, storage and later processing properties, while maintaining the dimensional stability and structural integrity.

Additionally, the use of FRP parts provided in an advanced B-stage condition, that is, having a degree of cure of the resin between 25% and 75%, has relevant advantages, namely:

The storage of partially cured FRP parts can be done at room temperature during long periods of time.

The handling and transport of the partially cured FRP parts is much easier than that for green/fresh subcomponents.

The integration of the partially cured FRP parts prevents the need of adhesive at the bonding interface.

According to the method of the invention, with respect to the curing process of the ensemble according to step f), heat is applied to allow reaching the proper temperature to complete the polymerization of the resin. Application of heat may be performed in different ways.

In an embodiment, step f) comprises introducing the mold housing the ensemble in an oven.

In an embodiment, step f) comprises heating by means of heating means integrated in the first and/or the second mold parts.

Among other operating principles, the heating means can be resistive, inductive, pneumatic or hydraulic.

In an embodiment, the method comprises, before step a), manufacturing each partially cured FRP part by applying a partial curing cycle, wherein the partial curing cycle is performed:

at a lower temperature compared to a temperature adapted to complete a curing cycle according to which the partially cured FRP parts are completely cured, and/or during a shorter time compared to a time required to complete a curing cycle according to which the partially cured FRP parts are completely cured.

In an embodiment, the method comprises, before applying the partial curing cycle, manufacturing at least one partially cured FRP part by applying at least one of the following techniques:

laying up a laminate comprising FRP plies over a mold, preferably by Automated Fiber Placement (AFP) or Automated Tape Laying (ATL) techniques;

liquid resin infusion/injection or resin film infusion of dry fiber reinforcements.

As previously defined, when the polymer matrix is a thermoset resin (e.g., an epoxy), such resin may appear in three different conditions depending on the degree of the polymerization. Among the conditions, the components of B-stage materials have been mixed and the chemical reaction has started and progressed up to a 10% approximately.

This is the case of prepregs. A 'prepreg' is a composite material made from pre-impregnated fibers and a partially cured polymer matrix, such as epoxy or phenolic resin. The matrix is used to bond the fibers together. In the same way as other composite materials, the curing process induces chemical reactions that create extensive cross-linking between polymer chains to produce an infusible and insoluble polymer network. During cross-linking at sufficiently high temperatures, the material changes from a liquid via a gel into a glass-like solid.

With respect to the lay-up techniques referred to, Automated Tape Laying (ATL), or Automated Fiber Placement (AFP), both processes are functionally similar, comprising applying resin-impregnated fiber material (the so called 'prepreg'). However, each process is used differently to achieve specific structure construction goals to provide strength or stiffness where needed. Particularly, the use of one or the other mainly depends on the geometry complexity of the part to manufacture, wherein AFP allows higher curvatures.

Typically, a number of composite plies or tapes are laid-up one upon another on a mold, thus resulting in a stack of plies. In this regard, a 'ply' should be understood as a single continuous area of composite material to be laid on a mold, where two plies in the same layer do not normally overlap. The laying-up of plies forms a stack which is known as a 'laminate' or as a whole 'preform'.

Regarding the molds, mandrels or male molds should be regarded as shaping surfaces identical to the item being manufactured over the mold.

The fibrous material reinforcement may be glass (for Glass Fiber Reinforcement Polymer, 'GRFP'), carbon (for Carbon Fiber Reinforcement Polymer, 'CRFP'), polymer fibers or any other conventional material used as reinforcement. Among them, carbon is preferred.

With respect to the resin infusion/injection techniques, examples of the techniques are 'Resin Film Infusion' ('RFF'), 'Resin Infusion' ('RY'), 'Modified Vacuum Infusion' ('MVI'), or 'Resin Transfer Molding' ('RTM'). These composite manufacturing techniques rely on a closed mold hosting the laid-up fiber preform into which the resin is to be infused/injected. These specific techniques differ from each other on the tooling, manufacturing steps and even curing tools used.

In general terms, the dry fabric or fiber preform is placed into the cavity of a mold, then the mold is closed and the thermoset resin (typically epoxy resin) is injected through a set of injection ports under relatively low pressure.

The 'tooling' shall be understood as the set of instruments and tools that are used and contribute to optimizing the performance of the manufacturing process operations of the FRP structures, or composite materials. Examples of 'tooling' comprise:

molds;
  vacuum bags;
  caul plates;
  autoclave
  heating equipment;

On the other hand, the form-up step (the so-called 'preforming') may be done by two different technologies: hot forming or press-forming. Briefly, hot-forming uses a membrane and heat, while the press-forming uses a press and force.

Therefore, multiple combinations of manufacturing processes (i.e., related to tool options) can be used for manufacturing the partially cured FRP parts provided according to step a) of the method.

In an embodiment, the method comprises, before step b), performing a surface treatment on the first bonding portion and/or the second bonding portion, such as plasma projection, corona discharge, grit blasting and/or laser abrading.

Advantageously, surface treatment of the bonding portions, that is, the surfaces which are to be brought into contact to carry out the integration of parts to build the ensemble which has the final geometry of the composite structure to be manufactured, allows enhancing the properties of the integration of sub-components. In particular, surface treatment of composite materials for bonding, pursues the following main technical effects:

Cleaning: This means reducing the amount of detrimental contaminants on the surface to a level where intimate (molecular level) contact of the bonding portions is achieved.

Activation: The surfaces of the bonding portions which are brought into intimate contact are treated to be chemically active enough to form primary or secondary chemical bonds between them. A clean surface that is chemically inert cannot form the chemical bonds necessary for strong and reliable structural adhesion.

For composite materials, where thermoset and thermoplastic polymers have relatively low surface energies, surface treatment of composites usually focuses on the second factor listed above: increasing the surface energy, that is the chemical reactivity of the bonding portion, so that a strong bond can be formed between parts.

In an embodiment, step b) comprises applying pressure to bring the first bonding portion and the second bonding portion into contact; and applying a partial curing cycle, wherein the partial curing cycle is performed:

at a lower temperature compared to a temperature adapted to complete a curing cycle according to which the partially cured FRP parts are completely cured, and/or
  during a shorter time compared to a time adapted to complete a curing cycle according to which the partially cured FRP parts are completely cured.

In order to form the ensemble, according to step b), which is intended to be cured to obtain the composite structure, it is possible to apply a certain pressure to the portions of the partially cured FRP parts that are in contact, that is, to the first and second bonding portions of the first and second partially cured FRP parts prior to the introduction of the ensemble into the mold, that is, according to an embodiment wherein step b) is performed prior to steps c) and d). Preferably, such pressure will have a value comprised in the range from 0 to 9 bar.

Advantageously, the contact between the bonding portions is facilitated and improved. Furthermore, according to one embodiment, it is possible to apply temperature to the ensemble at the same time as the consolidating pressure is applied, so as to increase the degree of cure/polymerization to a desired value, prior to the introduction of the ensemble into the mold, according to step d) of the method, and to the application of the subsequent final curing process under vacuum, pressure and temperature conditions according to steps e) and f).

In an embodiment, vacuum in step e) is generated through at least one vacuum valve arranged on at least one of the first and second mold parts, wherein the vacuum valve establishes a fluidic communication between the inner chamber and the exterior of the first and second mold parts.

In an embodiment, step e) comprises providing:

a vacuum bag covering, at least partially, the joint area between the first and second mold parts; and
    sealing means configured for sealing the connection between the vacuum bag and the first and second mold parts.

In some embodiments, the coupling between the first and second mold parts may be airtight, such that the defined inner chamber is also airtight, and the vacuum provoked according to step e) of the method is generated through a vacuum valve arranged on at least one of the first and second mold parts.

In other embodiments, the coupling between the first and second mold parts may not be airtight, so that certain areas of the coupling interface between the two mold parts remain open, i.e., allowing fluidic communication between the inner chamber and the surrounding atmosphere of mold. Advantageously, the provision of sealing means in conjunction with a vacuum bag covering, at least, the open areas, makes it possible to isolate the inner chamber and thus maintain vacuum conditions according to stage e) of the method.

In an embodiment, step d) comprises providing at least one resilient block between:

the first pressing surface and the first bonding portion of the first partially cured FRP part, and/or
  the second pressing surface and the second bonding portion of the second partially cured FRP part.

In an embodiment, a resilient block comprises an inflatable bellow in contact with either the first or second pressing surface, and a resilient caul arranged between the inflatable bellow and the first or second bonding portion.

According to this embodiment, the pressure exerted by the corresponding mold part through the pressing surface is transmitted uniformly over the bonding portion.

In an embodiment, the method comprises controlling the internal pressure of an inflatable bellow for adjusting the pressure exerted on a corresponding first or second bonding portion of a respective first or second partially cured FRP part.

Advantageously, according to this embodiment, the pressure exerted on at least one bonding portion can be precisely adjusted. In particular, this embodiment makes it possible to control the pressure exerted, homogeneously, on the bonding portion and, in the case of an embodiment in which more than one inflatable bellow/resilient caul are implemented between successive pressing surfaces of a mold part and the corresponding bonding portions, it makes it possible to apply different pressures to each of the bonding surfaces by differentiated control of the internal pressure of each inflatable bellow.

In an embodiment, the method comprises, after curing the ensemble according to step f), cooling down the ensemble.

Advantageously, implementing a forced cooling ramp allows to reduce the overall time invested in the manufacturing process of the composite structure, thus speeding up the lead time of the manufactured part, as well as allowing to increase the production rate of the tooling used.

In an embodiment, the first partially cured FRP part is a substantially flat panel, and the first mold part is provided with a pneumatic circuit configured to air-tightly communicate a vacuum system with the inner chamber through at least one vacuum valve, and, in step d)

the substantially flat panel is arranged on the first mold part covering at least one vacuum valve; and vacuum is applied through the vacuum valve, fixing the substantially flat panel to the first mold part by the suction generated.

In an embodiment, the second partially cured FRP part is an omega-profile stringer configured to be joined to the substantially flat panel through two foot portions of the omega-profile stringer which are configured to contact two corresponding bonding portions of the substantially flat panel, such that a material-free enclosure is defined between the two foot portions of the omega-profile stringer, the inner side of the omega-profile stringer, and the portion of surface of the substantially flat panel located between the two bonding portions contacting the foot portions of the omega-profile stringer; wherein, in step d) the ensemble is arranged such that at least one vacuum valve is arranged contacting the portion of the substantially flat panel defined between the two bonding portions contacting the foot portions of the omega-profile stringer.

In the composite structure manufacturing industry, and more particularly in the aeronautical field, several structural components are used as stiffeners for adding rigidity and strength to adjacent load carrying panels or skins. As aforementioned, stringers are stiffening elements that can be manufactured according to multiple shapes and configurations.

Among them, 'Ω-profile' ('omega') stringers contribute to preventing the skin of an aircraft from buckling or bending under compression or shear loads. In addition, these structural (e.g., stiffening) components may transfer aerodynamic loads acting on the skin—of the wing, fuselage section, etc.—onto other supporting structures such as frames, beams, or ribs.

Regarding their shape and their implementation in the present method as a partially cured FRP part to be used for the manufacturing of a composite structure, omega-profile stringers shall be regarded as semi-tubular stiffening components which have a geometry that folds back on itself and defines a semi-closed section (or 'enclosure' free of material), except for an open portion which coincides with the coupling interface through which omega-profile stringers are bonded to another FRP structural part, such as a substantially flat panel. Additionally, regarding the open portion of an omega-profile stringer, two foot portions extend outwards from a respective end of the open portion, pointing in opposite directions.

According to this embodiment, the stringer is joined to a substantially flat panel via these foot portions. Once bonded, the foot portions contact the substantially flat panel and the enclosure free of material is defined between the two foot portions of the omega-profile stringer, the inner side of the omega-profile stringer, and the portion of surface of the substantially flat panel located between the two bonding portions contacting the foot portions of the omega-profile stringer.

The ensemble, that is, the omega-profile stringer bonded to the substantially flat panel, defining the enclosure free of material therebetween, is arranged such that at least one vacuum valve is arranged contacting the portion of the substantially flat panel defined between the two bonding portions contacting the foot portions of the omega-profile stringer.

Advantageously, the substantially flat panel is fixed to the first mold part by the suction generated. Furthermore, the portion of the substantially flat panel defined between the two bonding portions contacting the foot portions of the omega-profile stringer is prevented, by means of the suction generated, to collapse, buckling or bending towards the interior of the enclosure free of material, due to the vacuum generated in the inner chamber according to step e) of the present embodiment of the method. Therefore, it shall be understood that a vacuum, (or a first vacuum) according to step e) is generated inside the inner chamber in such a way that atmospheric pressure exerts a closure force on the first and second mold parts. According to one embodiment, in order to generate the first vacuum there will be at least one vacuum valve provided on one of the first or second mold parts configured to establish a fluidic communication between the inner chamber with the outside of the mold, for example, through a vacuum system. On the other hand, in order to keep the substantially flat panel fixed to the first mold part and prevent the collapse of a portion thereof due to the effect of the first vacuum that is generated inside the inner chamber, a vacuum valve is implemented, according to the present embodiment, which at all times remains covered by the substantially flat panel to exert on it a suction cup effect by means of a second vacuum.

In a second inventive aspect, the invention provides a manufacturing tool for manufacturing a composite structure according to an embodiment of the method of the first inventive aspect, wherein this manufacturing tool comprises:

at least a first and a second mold part configured to couple to each other such that an inner chamber is defined when the first and second mold parts are coupled to each other, and means to apply vacuum to the inner chamber;

wherein:

the first mold part is provided with a first pressing surface, the second mold part is provided with a second pressing surface, such that the first and second pressing surfaces are configured to be arranged facing each other when the first and second mold parts are coupled to each other, and the first and/or the second mold part is provided with a pneumatic circuit configured to air-tightly communicate the means to apply vacuum with the inner chamber through at least one vacuum valve arranged on the first and/or the second mold part.

In an embodiment, the tool comprises heating means configured for heating the inner chamber.

In an embodiment, the tool comprises at least one vacuum valve arranged on at least one of the first and second mold parts, wherein the vacuum valve establishes a fluidic communication between the inner chamber and the exterior of the first and second mold parts.

In an embodiment, the tool comprises a plurality of vacuum valves.

In an embodiment, the tool comprises:

a vacuum bag covering, at least partially, the joint area between the first and second mold parts; and sealing means configured for sealing the connection between the vacuum bag and the first and second mold parts.

In an embodiment, the tool comprises at least one resilient block configured to be arranged between:

the first pressing surface and a first bonding portion of a first partially cured FRP part, and/or the second pressing surface and a second bonding portion of a second partially cured FRP part.

In an embodiment, the tool comprises a plurality of resilient blocks.

In an embodiment, the resilient block comprises an inflatable bellow in contact with either the first or second pressing surface, and a resilient caul configured to be arranged between the inflatable bellow and the first or second bonding portion.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from preferred embodiments of the invention, given just as examples and not being limited thereto, with reference to the drawings.

DETAILED DESCRIPTION OF THE PREFERRED EMBODIMENTS

Figure 1:
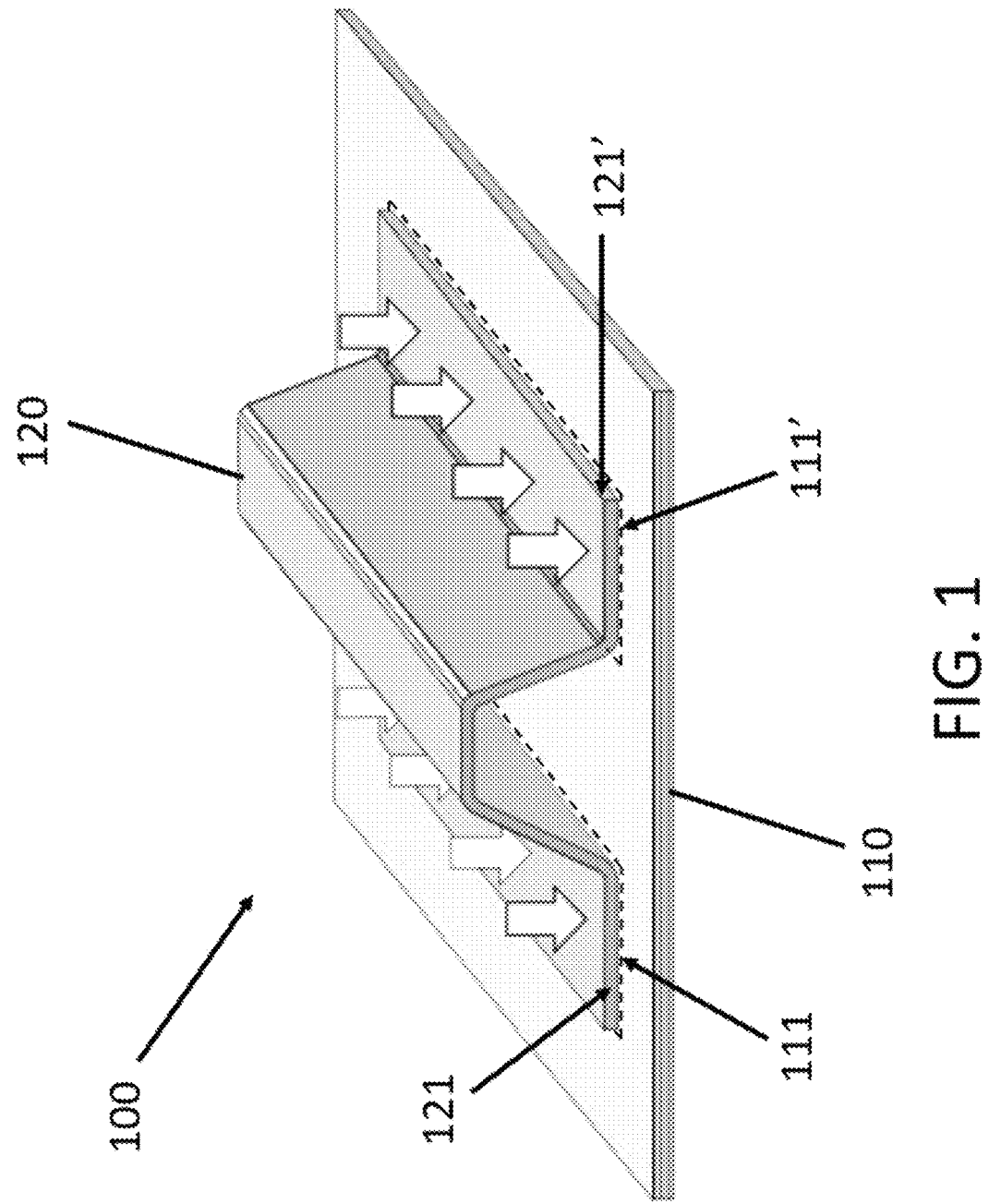
FIG. 1 shows a schematic representation of a perspective view of two partially cured FRP parts provided according to steps of a method for manufacturing a composite structure according to an embodiment of the present invention.

The present invention provides a method and a tool for manufacturing a composite structure.

The method according to the invention comprises at least the following steps:

a) providing at least two partially cured fiber reinforced polymer (FRP) parts (110, 120);

b) forming an ensemble (100) by joining at least two partially cured FRP parts (110, 120) by bringing into contact a first bonding portion (111) of a first partially cured FRP part (110) with a second bonding portion (121) of a second partially cured FRP part (120);

c) providing a mold comprising a first mold part (210) and a second mold part (220) configured for coupling with each other, such that an inner chamber is defined when the first (210) and second (220) mold parts are coupled to each other, the inner chamber being configured for housing the ensemble (100) inside, wherein the first mold part (210) is provided with a first pressing surface (211), and the second mold part (220) is provided with a second pressing surface (221), such that the first (211) and second (221) pressing surfaces are configured to be arranged facing each other when the first (210) and second (220) mold parts are coupled to each other;

d) coupling the first (210) and second (220) mold parts such that the ensemble (100) is housed within the inner chamber defined by the first (210) and second (220) mold parts, wherein the first pressing surface (211) presses against the first bonding portion (111) of the first partially cured FRP part (110), and the second pressing surface (221) presses against the second bonding portion (121) of the second partially cured FRP part (120), such that the pressure exerted by the first (211) and second (221) pressing surfaces presses the first (111) and second (121) bonding portions against each other;

e) producing a vacuum in the inner chamber; and f) curing the ensemble (100) under vacuum and temperature.

FIG. 1 shows some of the manufacturing steps, according to an embodiment of the method of the present invention, to obtain a composite structure. Particularly, FIG. 1 shows the provision of two partially cured FRP parts (110, 120) according to step a). More in particular, a first partially cured FRP part (110) and a second partially cured FRP part (120) are shown bonded together to form an ensemble (100) according to step b).

The ensemble (100) is formed by the union of two first bonding portions (111, 111') belonging to the first partially cured FRP part (110) with two respective second bonding portions (121, 121') of the second partially cured FRP part (120).

As it can be seen, in the embodiment shown the first partially cured FRP part (110) is a substantially flat panel, and the second partially cured FRP part (120) is an omega-profile stringer. In this embodiment, the second bonding portions (121, 121') of the second partially cured FRP part (120) are the two foot portions of the omega-profile stringer (120). The omega-profile stringer (120) is joined to the substantially flat panel (110) through the foot portions (121, 121'), which are in contact with two corresponding first bonding portions (111, 111') of the substantially flat panel (110).

A material-free enclosure is defined between the two foot portions (121, 121') of the omega-profile stringer (120), the inner side of the omega-profile stringer (120), and the portion of surface of the substantially flat panel (110) located between the two bonding portions (111, 111') contacting the foot portions (121, 121') of the omega-profile stringer (120).

In the particular embodiment shown, both partially cured FRP parts (110, 120) have been previously manufactured by applying a partial curing cycle, wherein the partial curing cycle is performed at a lower temperature compared to a temperature required to complete a curing cycle according to which the two partially cured FRP parts (110, 120) would be completely cured, and/or during a shorter time compared to a time required to complete a curing cycle according to which the two partially cured FRP parts (110, 120) would be completely cured.

Additionally, the two foot portions (121, 121') of the omega-profile stringer (120) and the two bonding portions (111, 111') of the substantially flat panel (110) have been subjected to respective surface treatments in order to enhance the properties of the integration between the partially cured FRP parts (110, 120) by cleaning and activating the surfaces that are intended to be bonded. Examples of such surface treatments are plasma projection, corona discharge, grit blasting and/or laser abrading.

Finally, the integration of the partially cured FRP parts (110,120) to form the ensemble (100) shown according to step b) has been performed by applying temperature and a pressure between 0 and 9 bar to bring the two foot portions (121, 121') of the omega-profile stringer (120) and the two bonding portions (111, 111') of the substantially flat panel (110) into contact.

In particular, in this embodiment the omega-profile stringer (120) and substantially flat panel (110) have been integrated into an ensemble (100) by being subjected to a partial curing cycle performed at a lower temperature compared to a temperature required to achieve complete curing and/or during a shorter time compared to a time required to achieve complete curing.

The manufacturing tool according to the invention comprises:

at least a first (210) and second (220) mold parts configured to couple to each other such that an inner chamber is defined when the first (210) and second (220) mold parts are coupled to each other, and means to apply vacuum to the inner chamber.

The first mold part (210) is provided with a first pressing surface (211), and the second mold part (220) is provided with a second pressing surface (221), such that the first (211) and second (221) pressing surfaces are configured to be arranged facing each other when the first (210) and second (220) mold parts are coupled to each other.

The first (210) and/or the second (220) mold part is provided with a pneumatic circuit (290) configured to airtightly communicate the means to apply vacuum with the inner chamber through at least one vacuum valve (280) arranged on the first (210) and/or the second (220) mold part.

Figure 2:
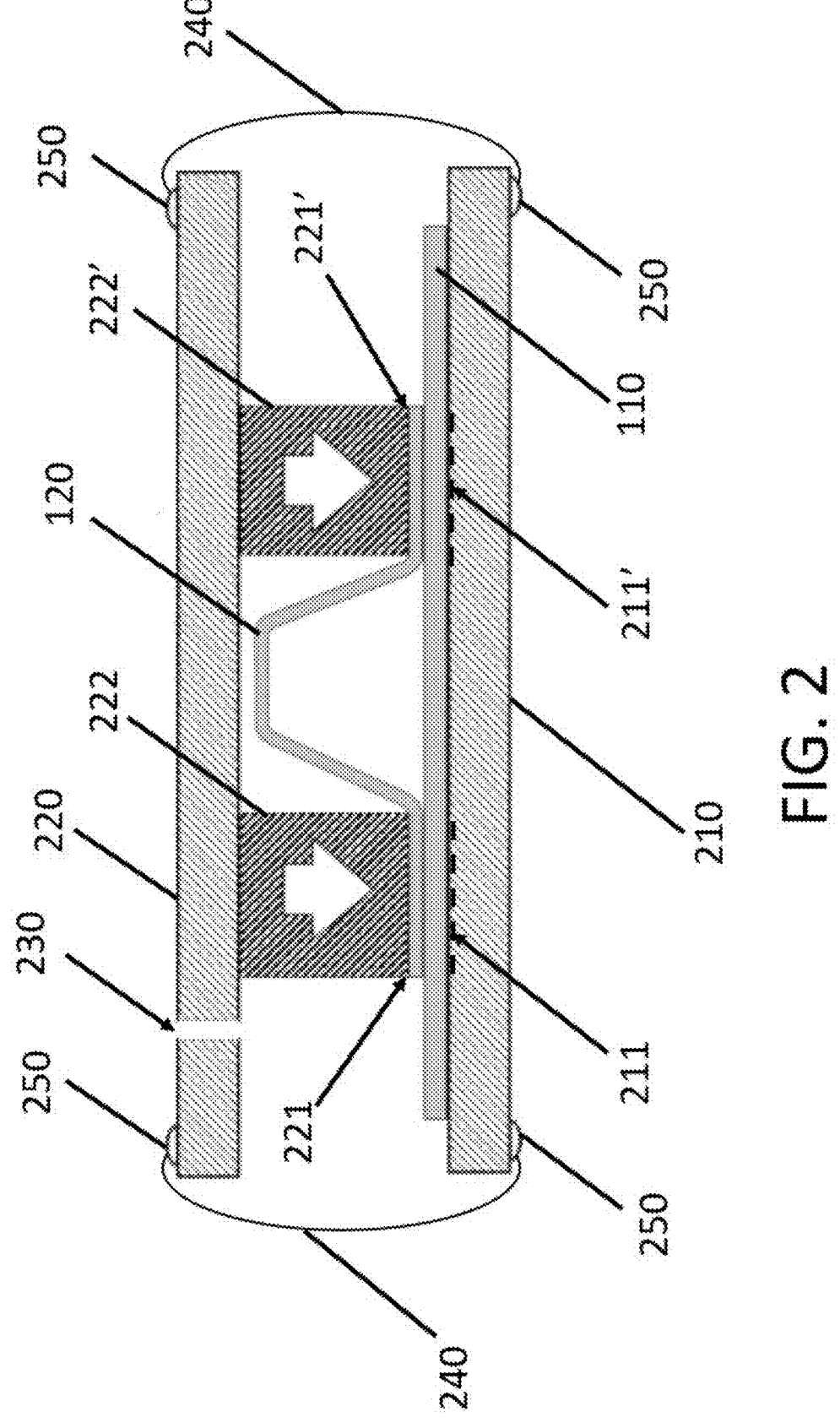
FIG. 2 shows a schematic representation of two partially cured FRP parts bonded together and confined within a manufacturing tool according to an embodiment of the present invention.

FIG. 2 schematically shows a manufacturing tooling according to the invention. Also, additional steps that an embodiment of the method of the invention follows to manufacture a composite structure are explained based on this figure, and, more in particular, the additional steps necessary to cure the ensemble (100) shown in FIG. 1.

Particularly, FIG. 2 shows the provision of a mold, according to step c) inside of which is confined the ensemble (100) shown in FIG. 1. As it can be seen, the mold comprises a first mold part (210) and a second mold part (220) configured for coupling with each other, such that an inner chamber is defined when the first (210) and second (220) mold parts are coupled to each other.

In the particular embodiment shown in FIG. 2, the inner chamber corresponds to the space that separates the first (210) and the second (220) mold parts and where, as can be seen, the ensemble (100) is housed. Regarding the ensemble (100), the substantially flat panel (110) is shown resting on a flat surface of the first mold part (210) along its entire surface.

In turn, the second mold part (220) is shown separated a certain height from the upper surface of the omega-profile stringer (120), which has a trapezoidal shape. The second mold part (220) is shown comprising two blocks (222, 222') configured to contact the foot portions (121, 121') of the omega-profile stringer (120) along their entire upper side (i.e., the side which is not in contact with the substantially flat panel (110)) by means of two second pressing surfaces (221, 221'), respectively.

It can be seen that two first pressing surfaces (211, 211') of the first mold part (210), which are represented with dashed lines, are located opposite the two second pressing surfaces (221, 221') of the second mold part (220).

By virtue of this configuration, and according to step d), the first (210) and second (220) mold parts are shown coupled to each other, such that the two first pressing surfaces (211, 211') of the first mold part (210) press against the two first bonding portions (111, 111') of the substantially flat panel (110); and the two second pressing surfaces (221, 221') of the second mold part (220) press against the two second bonding portions (121, 121'), i.e., the foot portions (121, 121'), of the omega-profile stringer (120).

In this way, the exerted pressure presses the substantially flat panel (110) against the omega-profile stringer (120), i.e., the two foot portions (121, 121') of the omega-profile stringer (120) against the corresponding two bonding portions (111, 111') of the substantially flat panel (110).

In order to generate the pressure necessary to carry out the consolidation in the curing process according to step f), which is applied to the bonding portions (111, 111'; 121, 121') of the ensemble (100) through the corresponding pressing surfaces (211, 211'; 221, 221') of the first (210) and second (220) parts of the mold, a vacuum is generated inside the inner chamber defined by the first (210) and second (220) parts of the mold, by means of a vacuum valve (230) arranged on at least one of the first (210) and second (220) mold parts, wherein the vacuum valve (230) establishes a fluidic communication between the inner chamber and the exterior of the first (210) and second (220) mold parts.

In particular, according to step e) of the method, vacuum is generated inside the inner chamber and then, due to the atmospheric pressure, the closure force of the first (210) and second (220) parts of the mold corresponds to the product of the negative vacuum achieved and the size of the surface of both pairs of pressing surfaces (211, 211'; 221, 221').

As it can be seen, the coupling between the first (210) and second (220) mold parts is not airtight in this embodiment, since the lateral ends of the mold remain open, i.e., allowing fluidic communication between the inner chamber and the surrounding atmosphere of mold.

In this sense, FIG. 2 shows the provision of sealing means (250) in conjunction with a vacuum bag (240) covering the lateral ends of the mold, making it possible to isolate the inner chamber and thus maintain vacuum conditions according to stage e) of the method.

Finally, according to the method of the invention, with respect to the curing process of the ensemble (100) according to step f), heat is applied to allow reaching the proper temperature to complete the polymerization of the resin. Application of heat may be performed in different ways.

In an embodiment, step f) comprises introducing the mold housing the ensemble (100) in an oven.

In another embodiment, step f) comprises heating by means of heating means integrated in the first (210) and/or the second (220) mold parts.

Figure 3:
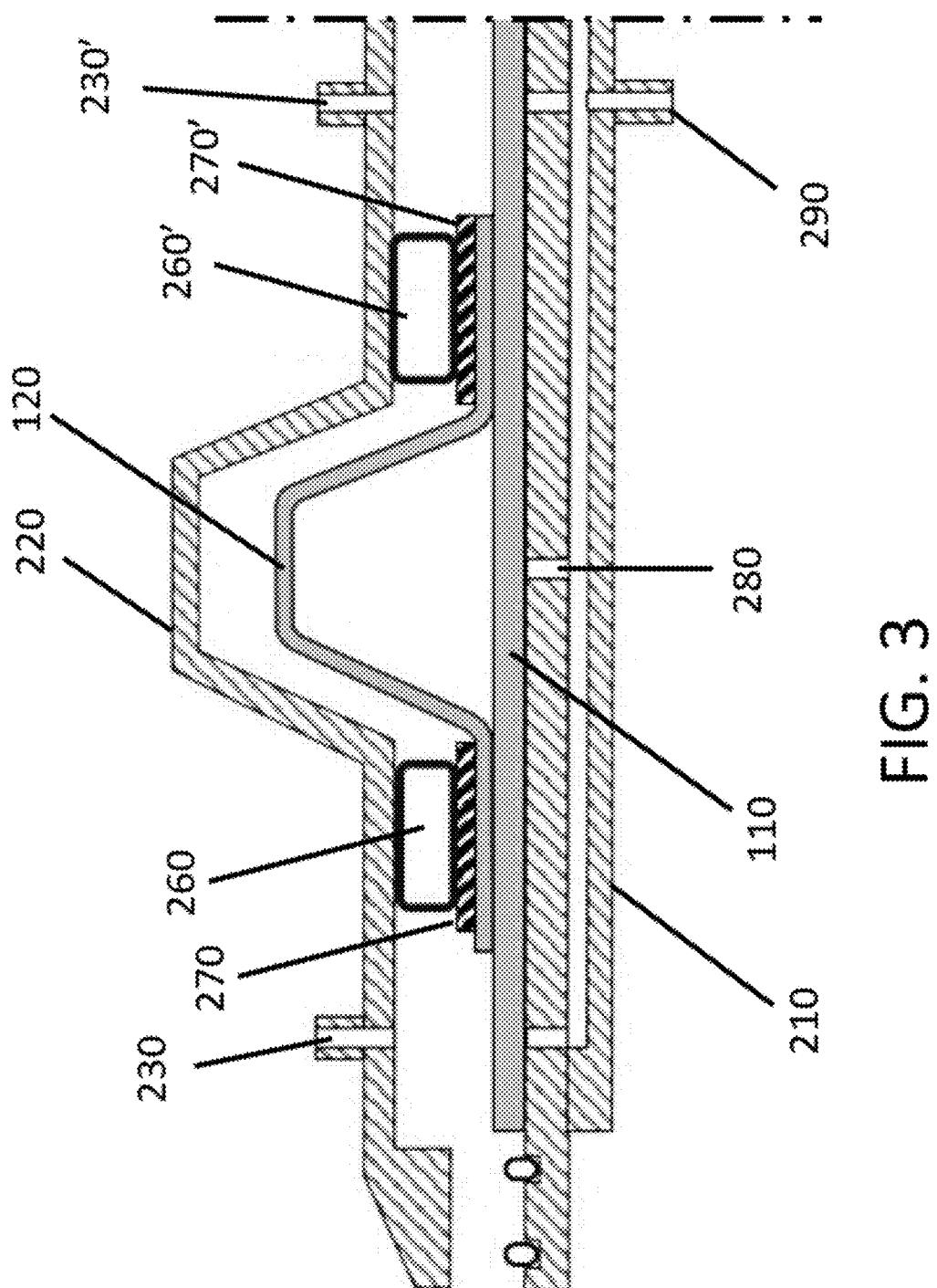
FIG. 3 shows a schematic representation of two partially cured FRP parts bonded together and confined within a first and a second mold parts, wherein a flexible caul and an inflatable bellow is shown interposed between the pressing surfaces of a mold part and the bonding portion of a partially cured FRP part, according to an embodiment of the present invention.

FIG. 3 shows another embodiment of the manufacturing tooling according to the present invention. In particular, in the embodiment of FIG. 3 the second mold part (220) has a geometry complementary to that of the omega-profile stringer (120), i.e., with a trapezoidal relief reproducing that of the omega-profile stringer (120) and allowing the second mold part (220) to couple with the first mold part (210) by fitting on the outer surface of the omega-profile stringer (120).

Furthermore, FIG. 3 shows two resilient blocks, each resilient block located between one of the two second pressing surfaces and the corresponding foot portion of the omega-profile stringer (120). More in particular, in this embodiment each resilient block comprises an inflatable bellow (260, 260') in contact with one of the two second pressing surfaces of the second mold part (220), and a resilient caul (270, 270') arranged between an inflatable bellow (260, 260') and the corresponding foot portion of the omega-profile stringer (120).

According to this embodiment, the interposition of a resilient block and, more particularly, of an inflatable bellow (260, 260') and a resilient caul (270, 270'), between a pressing surface of the second mold part (220) and the corresponding foot portion of the omega-profile stringer (120) allows to transmit uniformly the pressure exerted by the second mold part (220) through the pressing surface to the bonding portion during step d) of the method.

Additionally, the configuration of the manufacturing tooling shown in FIG. 3 allows the controlling of the internal pressure of the inflatable bellows (260, 260') for adjusting the pressure exerted on each corresponding foot portion of the omega-profile stringer (120).

Finally, FIG. 3 also depicts the first mold part (210) being provided with a pneumatic circuit (290) configured to airtightly communicate a vacuum system with the inner chamber through at least one vacuum valve (280). In particular, according to step d) of the method, and as it can be seen, the substantially flat panel (110) is arranged on the first mold part (210) covering the vacuum valve (280).

Advantageously, the substantially flat panel (110) is fixed to the first mold part (210) by the suction generated when vacuum is applied through the vacuum valve (280).

Just like the ensemble (100) shown in FIG. 1, the omega-profile stringer (120) is joined to the substantially flat panel (110) through two foot portions which are in contact with two corresponding bonding portions of the substantially flat panel (110), such that an enclosure free of material is defined between the two foot portions of the omega-profile stringer (120), the inner side of the omega-profile stringer (120), and the portion of surface of the substantially flat panel (110) located between the two bonding portions contacting the foot portions of the omega-profile stringer (120).

As can be seen, and according to step d) of the method, the ensemble (100) is arranged such that the vacuum valve (280) is arranged contacting the portion of the substantially flat panel (110) defined between the two bonding portions contacting the foot portions of the omega-profile stringer (120).

According to this embodiment, apart from being fixed to the first mold part (21) by the suction generated, the portion of the substantially flat panel (110) defined between the two bonding portions contacting the foot portions of the omega-profile stringer is prevented, by means of the suction generated, to collapse, buckling or bending towards the interior of the enclosure free of material, due to the vacuum generated in the inner chamber according to step e) of the present embodiment of the method by means of the vacuum valves (230, 230') shown, respectively, in FIGS. 2 and 3.

According to different embodiments of the invention, step b) of the method may be performed at different moments.

In the particular embodiments of FIGS. 2 and 3 step b) is performed prior to steps c) and d). That is, the ensemble (100) of FIG. 1 formed by a substantially flat panel (110) and an omega-profile stringer (120) is formed at a stage prior to inserting the ensemble (100) into the mold, as shown in FIGS. 2 and 3.

In the particular embodiments of FIGS. 4 and 5, step b) is performed subsequently to steps c) and d). According to the embodiments shown, the partially cured FRP parts (110, 120, 120') are inserted in the mold before the partially cured FRP parts (110, 120, 120') are joined.

In an embodiment, a first partially cured FRP part is arranged on/attached to the first mold part, a second partially cured FRP part is arranged on/attached to the second mold part, and the ensemble is formed when the first and second mold parts are coupled, enclosing the ensemble within the inner chamber.

Figure 4:
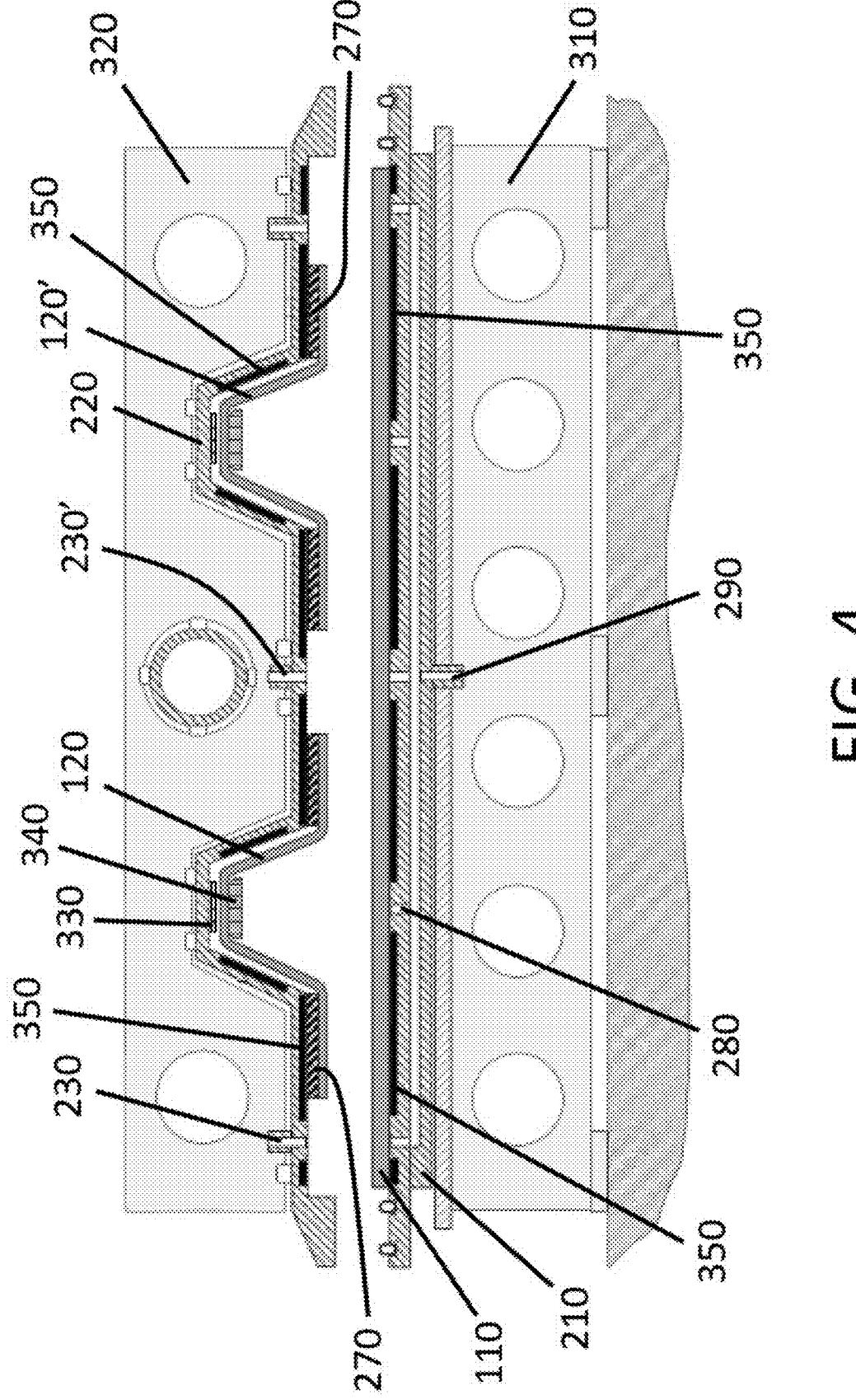
FIG. 4 shows a schematic representation of two partially cured FRP parts, wherein each of them is attached to a different mold part, such that the ensemble is formed when the mold parts are coupled, according to an embodiment of the present invention.
Figure 5:
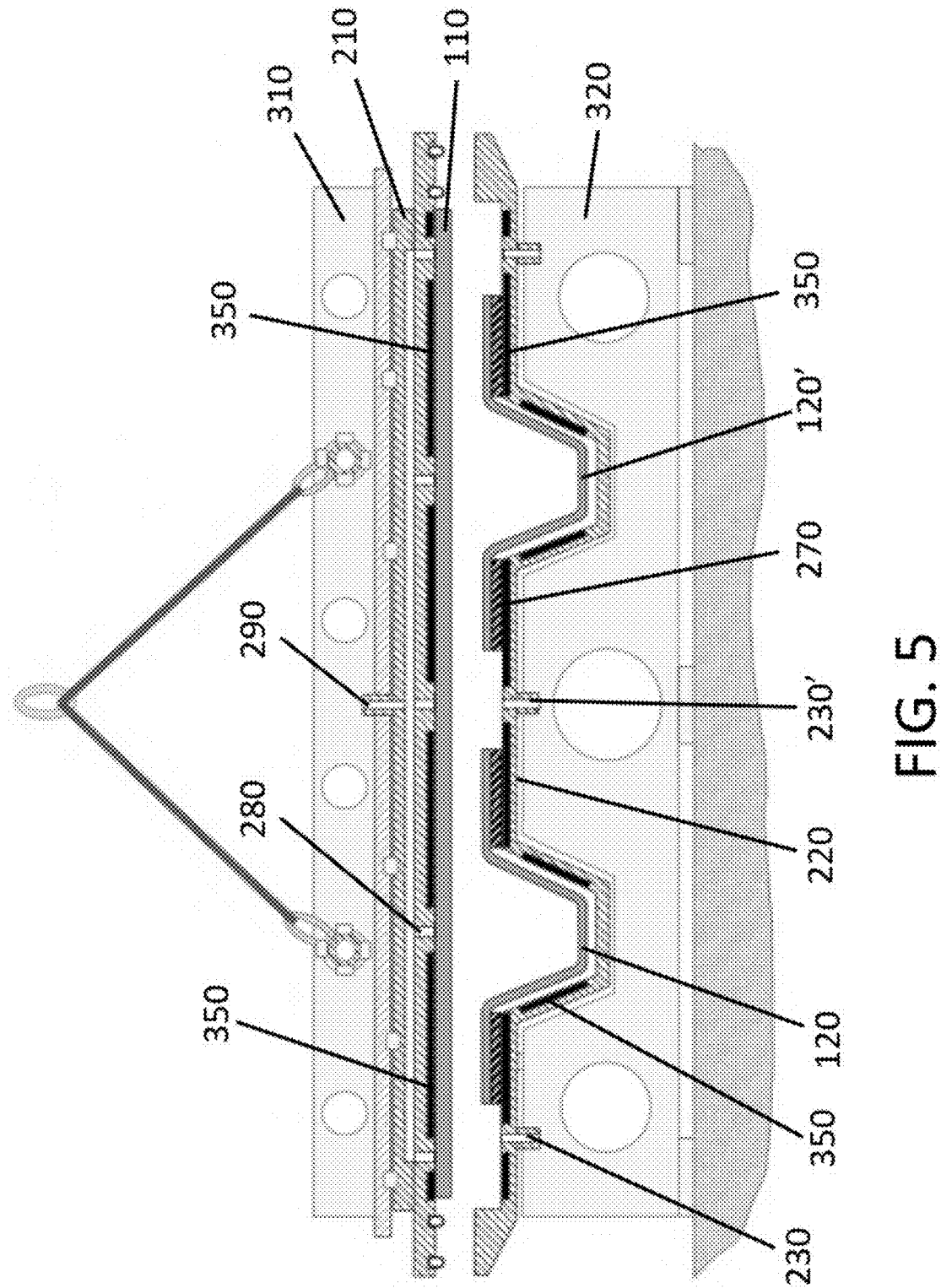
FIG. 5 shows a schematic representation of two partially cured FRP parts, wherein each of them is attached to a different mold part, such that the ensemble is formed when the mold parts are coupled, according to an embodiment of the present invention.

In FIGS. 4 and 5, two omega-profile stringers (120, 120') are intended to be bonded with a substantially flat panel (110). That is, more than two partially cured FRP parts are provided in step a) according to the embodiments shown. Accordingly, the first mold part (210) and the second mold part (220) are provided with a plurality of pairs of complementary pressing surfaces (i.e., a plurality of corresponding first or second pressing surfaces), each first pressing surface of the first mold part (210) being configured to be arranged facing a corresponding second pressing surface of the second mold part (220) when the first (210) and second (220 mold parts are coupled to each other.

More in particular, as it can be seen, when the first (210) and second (220) mold parts are coupled according to step d), the four foot portions of the two omega-profile stringers (120, 120') are brought into contact with four corresponding bonding portions of the substantially flat panel (110), and are pressed against them, by four pairs of opposite pressing surfaces of the first (210) and second (220) mold parts.

In the embodiment shown in FIG. 4, the second mold part (220) of the manufacturing tool is attached to a handling frame (320) which can be provided, according to further embodiments of the invention, for in-plant handling of mold parts (210, 220) with the appropriate industrial equipment, such as cranes. In turn, two omega-profile stringers (120, 120') are fixed to the second mold part (220), which is provided with trapezoidal profile cavities, by means of complementary electromagnets (330, 340).

As can be seen, in this embodiment the first mold part (210) is resting on a support frame (310). In turn, a first partially cured FRP part (110), that is, the substantially flat panel (110), is fixed to the first mold part (210) by suction through a plurality of suction valves (280) connected by means of a pneumatic circuit (290) to a vacuum system.

An ensemble is thus formed, according to step b) subsequently to steps c) and d), that is, when the first (210) and second (220) mold parts are coupled, enclosing the ensemble within the inner chamber.

In the embodiment shown in FIG. 5, the first mold part (210) is attached to the handling frame (310), and, in turn, the substantially flat panel (110) is fixed to the first mold part (210) by suction through a plurality of suction valves (280) connected by means of a pneumatic circuit (290) to a vacuum system.

As can be seen, the second mold part (220) is resting onto a support frame (320) and two omega-profile stringers (120, 120') are coupled to the second mold part (220) by being inserted into respective cavities provided with trapezoidal shape.

Additionally, both embodiments shown in FIGS. 4 and 5 comprise heating means (350) integrated in the first (210) and the second (220) mold parts. Among other operating principles, the heating means (350) can be resistive, inductive, pneumatic or hydraulic.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a composite structure, the method comprising the following steps:
   a) providing at least two partially cured fiber reinforced polymer (FRP) parts;
   b) forming an ensemble by joining the at least two partially cured FRP parts by bringing into contact a first bonding portion of a first partially cured FRP part with a second bonding portion of a second partially cured FRP part;
   c) providing a mold comprising a first mold part and a second mold part configured for coupling with each other, such that an inner chamber is defined when the first and second mold parts are coupled to each other, said inner chamber being configured to house the ensemble inside, wherein:
      the first mold part is provided with a first pressing surface, and the second mold part is provided with a second pressing surface, such that the first and second pressing surfaces are configured to be arranged facing each other when the first and second mold parts are coupled to each other;
   d) coupling the first and second mold parts such that the ensemble is housed within the inner chamber defined by said first and second mold parts, providing at least two inflatable bellows, and controlling an internal pressure of each of the at least two inflatable bellows to adjust a pressure exerted on at least one of the first partially cured FRP part and the second partially cured FRP part by each of the at least two inflatable bellows, wherein:
      the first pressing surface presses against the first bonding portion of the first partially cured FRP part,
      the second pressing surface presses against the second bonding portion of the second partially cured FRP part,
   such that a pressure exerted by the first and second pressing surfaces presses the first and second bonding portions against each other,
      each of the at least two inflatable bellows are disposed in non-contracting relationship with one another,
      and each of the at least two inflatable bellows exerts a different pressure on the at least one of the first partially cured FRP part and the second partially cured FRP part by differentiated control of the internal pressure of each of the at least two inflatable bellows, wherein a resilient caul is arranged between each of the inflatable bellows and the first or second bonding portion, such that each of the resilient cauls corresponds in size to a corresponding one of the at least two inflatable bellows;
   e) producing a vacuum in the inner chamber; and
   f) curing the ensemble under vacuum and temperature.

2. The method according to claim 1 further comprising, before step a), manufacturing each partially cured FRP part by applying a partial curing cycle, wherein the partial curing cycle is performed:
   at a lower temperature compared to a temperature required to complete a curing cycle according to which the partially cured FRP parts are completely cured, or
   during a shorter time compared to a time required to complete a curing cycle according to which the partially cured FRP parts are completely cured, or
   both.

3. The method according to claim 1, further comprising, before step b), performing a surface treatment on
   the first bonding portion,
   the second bonding portion, or
   both.

4. The method according to claim 3, wherein the surface treatment is performed by at least one of the following methods:
   plasma projection,
   corona discharge,
   grit blasting,
   laser abrading,
   any combination of these methods.

5. The method according to claim 1, wherein step b) comprises applying pressure to bring the first bonding portion and the second bonding portion into contact; and applying a partial curing cycle, wherein the partial curing cycle is performed:
   at a lower temperature compared to a temperature adapted to complete a curing cycle according to which the partially cured FRP parts are completely cured, during a shorter time compared to a time adapted to complete a curing cycle according to which the partially cured FRP parts are completely cured, or both.

6. The method according to claim 1, wherein the vacuum in step e) is generated through at least one vacuum valve arranged on at least one of the first and second mold parts, wherein said vacuum valve establishes a fluidic communication between the inner chamber and an exterior of the first and second mold parts.

7. The method according to claim 1, wherein step e) comprises providing:

a vacuum bag covering, at least partially, a joint area between the first and second mold parts; and sealing means configured to seal a connection between said vacuum bag and the first and second mold parts.

8. The method according to claim 1, wherein step f) comprises introducing the mold configured to house the ensemble in an oven.

9. The method according to claim 1, wherein step f) comprises heating by means of heating means integrated in the first or the second mold parts, or both.

10. The method according to claim 1, further comprising, after curing the ensemble according to step f), cooling down the ensemble.

11. The method according to claim 1, wherein the first partially cured FRP part is a substantially flat panel, and wherein the first mold part is provided with a pneumatic circuit configured to air-tightly communicate a vacuum system with the inner chamber through at least one vacuum valve, and wherein, in step d) the substantially flat panel is arranged on the first mold part covering at least one vacuum valve; and vacuum is applied through the vacuum valve, fixing the substantially flat panel to the first mold part by the suction generated.

12. The method according to claim 11, wherein the second partially cured FRP part is an omega-profile stringer configured to be joined to the substantially flat panel through two foot portions of the omega-profile stringer which are configured to contact two corresponding of the bonding portions of said substantially flat panel, such that a material-free enclosure is defined between the two foot portions of the omega-profile stringer, an inner side of the omega-profile stringer, and a portion of a surface of the substantially flat panel located between the two bonding portions contacting the foot portions of the omega-profile stringer;

wherein, in step d) the ensemble is arranged such that at least one vacuum valve is arranged contacting the portion of the substantially flat panel defined between the two bonding portions contacting the foot portions of the omega-profile stringer.

13. A method for manufacturing a composite structure, the method comprising the following steps:

a) providing at least two partially cured fiber reinforced polymer (FRP) parts;

b) forming an ensemble by joining the at least two partially cured FRP parts by bringing into contact a first bonding portion of a first partially cured FRP part with a second bonding portion of a second partially cured FRP part, wherein the first partially cured FRP part is a substantially flat panel;

c) providing a mold comprising a first mold part and a second mold part configured for coupling with each other, such that an inner chamber is defined when the first and second mold parts are coupled to each other, said inner chamber being configured to house the ensemble inside, wherein:

the first mold part is provided with a first pressing surface, the second mold part is provided with a second pressing surface, such that the first and second pressing surfaces are configured to be arranged facing each other when the first and second mold parts are coupled to each other, and the first mold part is provided with a pneumatic circuit configured to air-tightly communicate a vacuum system with the inner chamber through at least one vacuum valve;

d) coupling the first and second mold parts such that the ensemble is housed within the inner chamber defined by said first and second mold parts, wherein:

the first pressing surface presses against the first bonding portion of the first partially cured FRP part, the second pressing surface presses against the second bonding portion of the second partially cured FRP part, such that a pressure exerted by the first and second pressing surfaces presses the first and second bonding portions against each other, the substantially flat panel is arranged on the first mold part covering at least one vacuum valve, and vacuum is applied through the vacuum valve, fixing the substantially flat panel to the first mold part by the suction generated;

e) producing a vacuum in the inner chamber; and f) curing the ensemble under vacuum and temperature.

14. The method according to claim 1, wherein each of the at least two inflatable bellows is in direct contact with either: the first pressing surface and the first bonding portion of the first partially cured FRP part, or the second pressing surface and the second bonding portion of the second partially cured FRP part.

\* \* \* \* \*